United States Patent
Heller et al.

(10) Patent No.: US 10,954,343 B2
(45) Date of Patent: Mar. 23, 2021

(54) COMPOSITIONS COMPRISING BETA-KETOCARBONYL-FUNCTIONAL ORGANOSILICON COMPOUNDS

(71) Applicant: WACKER CHEMIE AG, Munich (DE)

(72) Inventors: Anton Heller, Simbach (DE); Christof Brehm, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 11 days.

(21) Appl. No.: 16/461,443

(22) PCT Filed: Nov. 16, 2016

(86) PCT No.: PCT/EP2016/077840
§ 371 (c)(1),
(2) Date: May 16, 2019

(87) PCT Pub. No.: WO2018/091077
PCT Pub. Date: May 24, 2018

(65) Prior Publication Data
US 2019/0345292 A1    Nov. 14, 2019

(51) Int. Cl.
*C08G 77/388* (2006.01)
*C08G 77/398* (2006.01)
*D06M 13/50* (2006.01)
*D06M 15/643* (2006.01)

(52) U.S. Cl.
CPC ......... *C08G 77/388* (2013.01); *C08G 77/398* (2013.01); *D06M 13/50* (2013.01); *D06M 15/6433* (2013.01); *D06M 15/6436* (2013.01); *D06M 2200/12* (2013.01); *D06M 2200/50* (2013.01)

(58) Field of Classification Search
None
See application file for complete search history.

(56) References Cited

U.S. PATENT DOCUMENTS

| 2,854,424 | A | 9/1958 | Solomon et al. |
| 6,121,404 | A | 9/2000 | Liles |
| 8,114,950 | B2 * | 2/2012 | Herzig .................. C08G 77/38 433/214 |
| 2002/0049296 | A1 | 4/2002 | Schafer et al. |
| 2005/0215806 | A1 | 9/2005 | Heller et al. |
| 2008/0293907 | A1 | 11/2008 | Herzig et al. |
| 2009/0144912 | A1 | 6/2009 | Herzig et al. |
| 2009/0197081 | A1 | 8/2009 | Herzig et al. |
| 2010/0305348 | A1 * | 12/2010 | Herzig ................. C07F 7/0889 556/9 |
| 2011/0015332 | A1 | 1/2011 | Martin et al. |
| 2011/0024679 | A1 | 2/2011 | Herzig |
| 2015/0112092 | A1 | 4/2015 | Fritz-Langhals |
| 2016/0121239 | A1 * | 5/2016 | Brehm ............... B01D 19/0409 510/405 |

FOREIGN PATENT DOCUMENTS

| GB | 884141 A | 12/1961 |
| JP | 9241509 A2 | 9/1997 |
| WO | 14184097 A1 | 11/2014 |
| WO | 16026737 A1 | 2/2016 |
| WO | 16042085 A1 | 3/2016 |

OTHER PUBLICATIONS

Walter Noll „Chemistry and Technology of Silicones, Kap9.1.6, S.447-452 (1968).
Charles Tomasino, "Chemistry & Technology of Fabric Preparation & Finishing," 1992, 268 pages.
Xiaowen Guo et al., Journal of Colloid and Interface Science, "Calculation of Hydrophile-lipophile balance for polyethoxylated surfactans by group contribution method", 298 (2006) 441-450.
Hans-Dieter Dörfler, Grenzflachen- und Kolloidchemie, VCH, Weinheim, 1994, S. 198 and English Abstract.

* cited by examiner

*Primary Examiner* — Robert S Loewe
(74) *Attorney, Agent, or Firm* — Brooks Kushman P.C.

(57) ABSTRACT

Compositions containing β-ketocarbonyl-functional organopolysiloxanes, aminoalkyl-functional organopolysiloxanes, and optionally an organometallic compound provide textiles with high and lasting water repellency.

12 Claims, No Drawings

COMPOSITIONS COMPRISING BETA-KETOCARBONYL-FUNCTIONAL ORGANOSILICON COMPOUNDS

CROSS REFERENCE TO RELATED APPLICATIONS

This application is the U.S. National Phase of PCT Appln. No. PCT/EP2016/077840 filed Nov. 16, 2016, the disclosure of which is incorporated in its entirety by reference herein.

BACKGROUND OF THE INVENTION

1. Field of the Invention

The invention relates to compositions comprising β-ketocarbonyl-functional organosilicon compounds and also to their use for finishing or impregnating fibrous substrates, especially for hydrophobizing fibrous substrates, the fibrous substrates preferably being textiles.

2. Description of the Related Art

It has been known for a long time that silicones on solid surfaces are able to generate water repellency properties.

Walter Noll, in his book "Chemistry and Technology of Silicones", in section 9.1.6, pages 447-452 (1968), describes the particularly pronounced hydrophobic properties of the Si—H-containing silicone oils. To date, accordingly, for hydrophobizing flexible substrates such as fibers or assemblies thereof in the form of yarns and textiles, the most effective silicone products have been developed on the basis of the Si—H-containing silicone oils.

U.S. Pat. No. 2,854,424 A describes an aqueous emulsion composition which comprises methylhydrogenpolysiloxane, a hydrolysate of 5% trimethylchlorosilane, 20% methyltrichlorosilane, 70% dimethyldichlorosilane, and 4 to 8% of a mixture of trichlorotrimethyldisilane and tetrachlorodimethyldisilane, and also a tin compound, and which, applied to textiles, is said to result in initial spray values of 100 and, after at least 6 dry-cleaning passes, spray values of at least 80 according to AATCC Standard Method 22-1952.

In his book "Chemistry & Technology of Fabric Preparation & Finishing", in chapter 9, pages 154-171 (1992), Charles Tomasino suggests that finishes with Si—H-containing polysiloxanes became more permanent in combination with creaseproof finishes. To impart greater flexibility to the brittle coatings produced on the fibers after the hydrolysis and condensation of the Si—H-containing polysiloxanes, the latter are blended with polydimethylsiloxanes. Here again, tin catalysts are recommended for the crosslinking.

The majority of effective tin organyls are nowadays classed as toxic and therefore shunned by textile finishers. Si—H-containing polysiloxanes as well find only limited acceptance, since especially in aqueous formulations they have a tendency to give off hydrogen gas.

In the search for alternatives, GB884141A, in example 1, describes a process for producing emulsions comprising polydimethylsiloxane and butyl titanate. The silicone oil and butyl titanate here are dissolved in white spirit, and this preliminary solution is then processed on to form an aqueous emulsion. Cellulose acetate fabrics finished with this emulsion were said to attain spray values of 100. A disadvantage associated with these formulations, however, is their limited shelf life.

Subsequently, organofunctional silicones are increasingly being used for service in fiber hydrophobization.

US 2011/0015332 A1 discloses emulsions comprising aminopolyorganosiloxanes and surfactant, with an amount of active substance of not more than 2.5%, and with no protonating agent being used.

WO 2014/184097 A1 describes in its examples combinations of amino-functional silicone polymers with wax and/or fatty acid esters. For application, all of the examples are admixed with a fixative in the form of an amino resin, urea derivative or melamine derivative.

The examples of WO 2016/042085 A1 describe compositions comprising aminopolysiloxanes and metal alkoxide in organic solvents, which are said to generate both water repellency and oil repellency properties on cotton textiles.

WO 2016/026737 A1 discloses oil-in-water emulsions comprising polydimethylsiloxane with aminoalkyl groups, protonating agent, and a silicate compound. In comparison to a similar product which, however, contains an MQ resin rather than the silicate compound, these emulsions are said to have a stronger water repellency effect.

The profile of requirements for silicone-containing hydrophobizing agents for use in imparting an original finish in industry includes not only outstanding water repellency but also a good shelf life, extremely simple and safe handling, and a pleasant soft hand. Products from the prior art provide only limited fulfilment of this profile of requirements.

Waxlike β-ketocarbonyl-functional silicones are described in US 2011/0024679 A1. The examples disclose generation by a reaction of an aminopolysiloxane with an alkyl ketene dimer. With the waxlike β-ketocarbonyl-functional silicones, a "gelling" of preferably volatile linear, branched or cyclic siloxanes is achieved, this phenomenon finding application in particular in cosmetics.

US 2009/0197081 A1 discloses compositions comprising β-ketocarbonyl-functional siloxane polymers and organic, Si-free polyamines. Fibers impregnated with this composition are said in spite of the high amine content to exhibit comparatively low yellowing qualities. In all of the examples, the reaction with the aforementioned Si-free polyamines takes place starting from silicone polyether acetoacetates.

Known from US 2009/0144912 A1 is a method for treating protein-containing fibers with compositions based on β-ketocarbonyl-functional siloxane polymers. The examples exhibit their hydrophobizing effect on chrome-tanned leather following application from organic solvents.

SUMMARY OF THE INVENTION

It was an object of the present invention to provide a silicone-containing composition which renders fibers washfast, water repellent, and flexible, and which is safe to handle. The object is achieved by the invention, employing a composition containing a β-ketocarbonyl-functional silicone, an aminoalkyl-functional silicone, and optionally, organometallic compound(s).

DETAILED DESCRIPTION OF THE PREFERRED EMBODIMENTS

A subject of the invention is thus compositions comprising (1) β-ketocarbonyl-functional organosilicon compounds which comprise at least one Si-bonded radical A of the general formula $$(Si)\text{-}L_1\text{-}[X^1\text{-}L^2\text{-}]_jX^2 \qquad (I)$$

where
- $L^1$ is identical or different and is a divalent, Si—C-bonded hydrocarbon radical having 1 to 18 carbon atoms,
- $L^2$ is identical or different and is a divalent hydrocarbon radical having 1 to 6 carbon atoms,
- $X^1$ is a radical of the formula —O—, —NZ—, —NR$^2$— or —S—, preferably —NZ—,
- $X^2$ is a radical of the formula —O—Z, —NH—Z, —NR$^2$—Z, —S—Z, preferably —NH—Z,
- Z is a radical of the formula —C(=O)—CHR$^3$—C(=O)—CH$_2$R$^3$,
- $R^2$ is a monovalent hydrocarbon radical having 1 to 18 carbon atoms,
- $R^3$ is a hydrogen atom or a monovalent, optionally substituted hydrocarbon radical having at least 12 carbon atoms, preferably having at least 14 carbon atoms,
- y is 0, 1, 2 or 3, preferably 0 or 1, more preferably 0, and
- (Si)— is the bond to the Si atom, (2) an amino-functional organosilicon compound having at least one Si-bonded radical B of the general formula $$(Si)—P^1—[Y^1—P^2—]_zY^2 \quad (II),$$

where
- $P^1$ and $P^2$ have the same definition as $L^1$ and $L^2$,
- $Y^1$ is a radical of the formula —NH— or —NR$^4$—,
- $Y^2$ is a radical of the formula NH$_2$ or NHR$^4$,
- $R^4$ has the same definition as $R^2$,
- z is 0, 1, 2 or 3, preferably 0 or 1, more preferably 1, and
- (Si)— is the bond to the Si atom, and optionally
(3) organometallic compounds.

β-Ketocarbonyl-functional organosilicon compounds (1) used may be silanes or oligomeric or polymeric organosiloxanes. They contain preferably 1 to 2000 Si atoms, more preferably 2 to 1000 Si atoms, and most preferably 20 to 700 Si atoms.

It is possible to use one kind of β-ketocarbonyl-functional organosilicon compound (1) or two or more kinds of β-ketocarbonyl-functional organosilicon compounds (1).

Preferred for use as β-ketocarbonyl-functional organosilicon compounds (1) are organopolysiloxanes consisting of units of the general formula

where
- A is a radical of the formula (I),
- R is a monovalent, optionally substituted hydrocarbon radical having 1 to 18 carbon atoms per radical,
- $R^1$ is a hydrogen atom or alkyl radical having 1 to 8 carbon atoms,
- a is 0 or 1
- b is 0, 1, 2 or 3, and
- c is 0 or 1, with the proviso that the sum a+b+c is not more than 3 and there is on average at least one radical A per molecule.

Preferred examples of β-ketocarbonyl-functional organosilicon compounds (1) are organopolysiloxanes of the general formula

where
- A is a radical of the formula (I),
- R* is identical or different and is a radical R or a radical of the formula —OR$^1$, where
- R and R$^1$ have the definition stated for them above,
- g is 0 or 1,
- h is 0 or 1,
- l is 0 or an integer from 1 to 2000, and
- k is 0 or an integer from 1 to 20, with the proviso that there is on average at least one radical A per molecule.

The β-ketocarbonyl-functional organosilicon compounds (1) used in the composition of the invention may be waxlike solids or liquids. In the latter case they preferably have a viscosity of 1 to 1 000 000 mPa·s at 25° C., more preferably 100 to 50 000 mPa·s at 25° C.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl, and methylcyclohexyl radicals; alkenyl radicals such as the vinyl, 5-hexenyl, cyclohexenyl, 1-propenyl, allyl, 3-butenyl, and 4-pentenyl radicals; alkynyl radicals such as the ethynyl, propargyl, and 1-propynyl radicals; aryl radicals such as the phenyl, naphthyl, anthryl, and phenanthryl radicals; alkaryl radicals such as o-, m-, and p-tolyl radicals, xylyl radicals, and ethylphenyl radicals; and aralkyl radicals such as the benzyl radical, and the α- and the β-phenylethyl radical.

Preferred examples of radicals R are the methyl radical, the n-octadecyl radical, the n-octyl radical, and the phenyl radical.

Examples of radicals $R^1$ are the hydrogen atom, or alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical, and isooctyl radicals, such as the 2,2,4-trimethylpentyl radical.

Preferred examples of $R^1$ are the hydrogen atom, and the methyl and ethyl radicals.

Examples of hydrocarbon radicals R are also valid for hydrocarbon radicals $R^2$.

The radical $R^3$ is a hydrogen atom or else, preferably a monovalent, optionally substituted hydrocarbon radical having at least 12 carbon atoms, preferably having at least 14 carbon atoms, and more preferably at most 20 carbon atoms.

The radical $R^3$ is preferably a hydrocarbon radical having 14 to 18 carbon atoms; more preferably the radical $R^3$ is a $C_{14}$-$C_{18}$ alkyl radical.

Examples of radicals R are the dodecyl, tetradecyl, hexadecyl, and the octadecyl radicals.

Examples of $L^1$ are divalent hydrocarbon radicals such as the methylene group, the 1,2-ethylene group, the 1,3-propylene group, the 1,3-butylene group, the 1,4-butylene group, the 1,5-pentylene group, and the 1,6-hexylene group.

Particularly preferred examples are the 1,3-propylene group and the 1,3-butylene group.

Examples of $L^2$ are divalent hydrocarbon radicals such as the 1,2-ethylene group, the 1,3-propylene group, the 1,3- butylene group, the 1,4-butylene group, the 1,5-pentylene group, and the 1,6-hexylene group.

A particularly preferred example is the 1,2-ethylene group.

The β-ketocarbonyl-functional organosilicon compounds (1) may be prepared by chemical reactions of carbinol-, amino-, or mercaptan-functional organosilicon compounds, preferably amino-functional organosilicon compounds, with diketene, 2,2,6-trimethyl-4H-1,3-dioxin-4-ones (diketene-acetone adduct) or, preferably, with the low-flammability and nontoxic alkyl ketene dimer (AKD).

β-Ketocarbonyl-functional organosilicon compounds (1) are prepared for example, for $R^3$=H, by the methods described in US 2008/0293907 A1, or, if $R^3$ is a hydrocarbon radical, by the methods described in US 2011/0024679 A1.

Amino-functional organosilicon compounds (2) may be silanes or oligomeric or polymeric organosiloxanes. They preferably contain 1 to 2000 Si atoms, more preferably 2 to 1000 Si atoms, and most preferably 20 to 700 Si atoms.

It is possible to use one kind of amino-functional organosilicon compound (2) or two or more kinds of amino-functional organosilicon compounds (2).

Preferred for use as amino-functional organosilicon compounds (2) are organopolysiloxanes consisting of units of the general formula

where

B is a radical of the formula (II),

R' is a monovalent, optionally substituted hydrocarbon radical having 1 to 18 carbon atoms per radical, $R^5$ is a hydrogen atom or an alkyl radical having 1 to 8 carbon atoms, d is 0 or 1 e is 0, 1, 2 or 3, and f is 0 or 1, with the proviso that the sum d+e+f is not more than 3 and there is on average at least one radical B per molecule.

Preferred examples of amino-functional organosilicon compounds (2) are organopolysiloxanes of the general formula

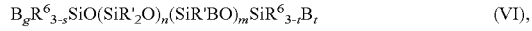

where

B is a radical of the formula (II), $R^6$ is identical or different and is a radical R' or a radical of the general formula —$OR^5$, where R' and $R^6$ have the definition stated for them above, s is 0 or 1, t is 0 or 1, n is 0 or an integer from 1 to 2000, and m is 0 or an integer from 1 to 20, with the proviso there is on average at least one radical B per molecule.

The organosilicon compounds (2) used in the compositions of the invention may be waxlike solids or liquids. In the latter case they preferably have a viscosity of 1 to 1,000,000 mPa·s at 25° C., more preferably 100 to 50,000 mPa·s at 25° C.

Examples of R' are the same as for R.

Examples of $R^5$ are the same as for $R^1$.

Amino-functional organosilicon compounds (2) are preferably prepared by the methods described in US 2005/0215806 A1, US 2002/0049296 A1 or US 2015/0112092 A1.

The organometallic compounds (3) may be amines, alkoxides, carboxylic acid salts, phosphoric acid salts or chelates of metals selected from the group of Pb, Zn, Zr, Sb, Fe, Cd, Sn, Ti, Ba, Ca, Mn, V, Al, and Co.

Preference is given to using organometallic compounds of Zn, Zr, Ti, and of Al. Particularly preferred are organometallic compounds of Zr and Ti.

Examples of carboxylic acid salts are naphthenates, octoates, hexoates, laurates, acetates, formates, citrates, and lactates.

Examples of organometallic compounds (3) are zinc, tin, and zirconium octoate; aluminum alkoxides such as Al tri-sec-butoxide, Al di-sec-butoxide monoacetylacetonate, Al mono-sec-butoxide diacetylacetonate, Al di-sec-butoxide monoethyl acetate, Al mono-sec-butoxide diethyl acetate, Al di-sec-butoxide monoacetate, and Al mono-sec-butoxide diacetate; alkyl titanates; alkyl zirconates; zinc, tin, zirconium, ferri-, and cobalt naphthenate; zinc and zirconium formate; tin, zinc, and zirconium acetate; dibutyltin dicaprylate, dilaurate, diacetate, and maleate; dioctyltin diformate, dibenzoate, and dicrotonate; alkanolamine titanates and zirconates; titanium phosphates; titanium acetylacetonates; ethyl citrate zirconate; and trialkoxyvanadates, such as trimethoxyvanadate, tri-n-butoxyvanadate, and triheptoxyvanadate. Preference is given to using alkoxides and carboxylic acid salts of titanium and zirconium.

Particularly preferred are butyl titanate, zirconium octoate, and zirconium acetate.

It is possible to use one kind of organometallic compound (3) or two or more kinds of organometallic compounds (3).

In the composition of the invention, the β-ketocarbonyl-functional organosilicon compound (1) and the amino-functional organosilicon compound (2) are used in weight ratios of 1:99 to 99:1, preferably in weight ratios of 20:80 to 80:10, more preferably in weight ratios of 40:60 to 70:20.

Where organometallic compounds (3) are additionally used, they are preferably used in amounts of 0.1 to 15 parts by weight, more preferably 0.5 to 8 parts by weight, based in each case on the metal content of the organometallic compounds (3), per 100 parts by weight of β-ketocarbonyl-functional organosilicon compounds (1) and amino-functional organosilicon compounds (2).

In one embodiment of the invention the composition of the invention is in solution in organic solvent.

Typical examples of organic solvents for the composition of the invention are hydrocarbons such as pentane, n-hexane, hexane isomer mixtures, heptane, octane, white spirit, petroleum ether, benzene, toluene, and xylene; halogenated hydrocarbons such as dichloromethane, trichloromethane, carbon tetrachloride, 1,2-dichloroethane, and trichloroethylene; alcohols such as methanol, ethanol, n-propanol, isopropanol, n-amyl alcohol, and isoamyl alcohol; ketones such as acetone, methyl ethyl ketone, diisopropyl ketone, and methyl isobutyl ketone (MIBK); esters such as ethyl acetate, butyl acetate, propyl propionate, ethyl butyrate, and ethyl isobutyrate; ethers such as tetrahydrofuran, diethyl ether, diisopropyl ether, and diethylene glycol dimethyl ether; and mixtures of these solvents.

If organic solvents are used, they are preferably used in an amount of 100 to 100,000 parts by weight per 100 parts by weight of the β-ketocarbonyl-functional organosilicon compound (1) and of the amino-functional organosilicon compound (2).

In another preferred embodiment of the invention, the compositions of the invention are in the form of aqueous dispersions which comprise β-ketocarbonyl-functional organosilicon compounds (1), amino-functional organosilicon compounds (2), optionally organometallic compounds (3), emulsifiers (4), and water (5).

Emulsifiers (4) are preferably used in amounts of 1 to 60 parts by weight, more preferably 2 to 30 parts by weight, based in each case on 100 parts by weight of the composition of the invention.

In the compositions of the invention it is possible to use all known kinds of emulsifiers. These are, for example, anionic, cationic, nonionic, and amphoteric emulsifiers, protective colloids, and particles which stabilize dispersions.

The emulsifiers (4) are preferably types available commercially, such as, for example, sorbitan esters of fatty acids having 10 to 22 carbon atoms; polyoxyethylene sorbitan esters of fatty acids having 10 to 22 carbon atoms and up to 35 weight percent of ethylene oxide content; polyoxyethylene sorbitol esters of fatty acids having 10 to 22 carbon atoms; polyoxyethylene derivates of phenols having 6 to 20 carbon atoms on the aromatic moiety and up to 95 weight percent of ethylene oxide content; fatty aminobetaines and amidobetaines having 10 to 22 carbon atoms; polyoxyethylene condensates of fatty acids or fatty alcohols having 8 to 22 carbon atoms with up to 95 weight percent of ethylene oxide content; ionic emulsifiers, such as alkylarylsulfonates having 6 to 20 carbon atoms in the alkyl group; fatty acid soaps having 8 to 22 carbon atoms; fatty sulfates having 8 to 22 carbon atoms; alkylsulfonates having 10 to 22 carbon atoms; alkali metal salts of dialkylsulfosuccinates; fatty amine oxides having 10 to 22 carbon atoms; fatty imidazolines having 6 to 20 carbon atoms; fatty amidosulfobetaines having 10 to 22 carbon atoms; quaternary emulsifiers, such as fatty ammonium compounds having 10 to 22 carbon atoms; fatty morpholine oxides having 10 to 22 carbon atoms; alkali metal salts of carboxylated, ethoxylated alcohols having 10 to 22 carbon atoms and up to 95 weight percent ethylene oxide; ethylene oxide condensates of fatty acid monoesters of glycerol having 10 to 22 carbon atoms and up to 95 weight percent ethylene oxide; mono- or diethanolamides of fatty acids having 10 to 22 carbon atoms; alkoxylated silicone emulsifiers having ethylene oxide units and/or propylene oxide units; alkyl phosphates or salts thereof.

Counterions in the case of anionic emulsifiers may be alkali metal ions, ammonium ions, or cations of substituted amines, such as trimethylamine or triethanolamine. Preference is normally given to ammonium, sodium, and potassium ions. In the case of cationic emulsifiers, the counterion is a halide, sulfate or methylsulfate. Chlorides are the compounds most available industrially.

Examples of emulsifiers (4) are decylaminobetaine; cocoamidosulfobetaine; oleylamidobetaine; cocoimidazoline; cocosulfoimidazoline; cetylimidazoline; 1-hydroxyethyl-2-heptadecenylimidazoline; n-cocomorpholine oxide; decyldimethyl-amine oxide; cocoamidodimethylamine oxide; sorbitan tristearate with condensed ethylene oxide groups; sorbitan trioleate with condensed ethylene oxide groups; sodium or potassium dodecylsulfate; sodium or potassium stearylsulfate; sodium or potassium dodecylbenzenesulfonate; sodium or potassium stearylsulfonate; triethanolamine salt of dodecyl sulfate; trimethyldodecylammonium chloride; trimethylstearyl ammonium methosulfate; sodium or potassium laurate; sodium or potassium myristate; di-n-butyl phosphate, di-n-hexyl phosphate, mono-n-octyl phosphate, di-n-octyl phosphate, mono-2-ethylhexyl phosphate, di-2-ethylhexyl phosphate, monoisononyl phosphate, diisononyl phosphate, mono-n-decyl phosphate, n-octyl n-decyl phosphate, di-n-decyl phosphate, monoisotridecyl phosphate, di-n-nonylphenyl phosphate, monooleyl phosphate, and distearyl phosphate, mono-n-octyl phosphate, di-n-octyl phosphate, mono-n-decyl phosphate, n-octyl n-decyl phosphate, di-n-decyl phosphate, ethoxylated castor oil having 200 ethylene glycol units, ethoxylated castor oil having 40 ethylene glycol units, and ethoxylated hydrogenated castor oil having 200 ethylene glycol units, polyoxyethylene(20) sorbitan stearate (polysorbate 60), polyoxyethylene(20) sorbitan tristearate (polysorbate 65), polyoxyethylene(20) sorbitan oleate (polysorbate 80), polyoxyethylene(20) sorbitan laurate (polysorbate 20), compounds of the formula iso-$C_{13}H_{27}$—O—$(CH_2CH_2O)_{10}$—H, iso-$C_{13}H_{27}$—O—$(CH_2CH_2O)_5$—H, iso-$C_{13}H_{27}$—O—$(CH_2CH_2O)_8$—H, $C_{16}H_{33}$—O—$(CH_2CH_2CHO)_4$—H, $C_{16}H_{33}$—O—$(CH_2CH_2O)_{20}$—H, $C_{18}H_{33}$—O—$(CH_2CH_2O)_{28}$—H, $C_{18}H_{37}$—O—$(CH_2CH_2O)_4$—H, $C_{18}H_{37}$—O—$(CH_2CH_2O)_{20}$—H, $C_{18}H_{37}$—O—$(CH_2CH_2O)_{25}$—H, $C_{18}H_{35}$—O—$(CH_2CH_2O)_{20}$—H, $C_{12}H_{23}$O—$(CH_2CH_2O)_4$—H, $C_{12}H_{23}$—O—$(CH_2CH_2O)_{23}$—H, $C_{16}H_{33}CH_2$—C(O)—O—$(CH_2CH_2O)_{20}$—H, $C_{16}H_{33}$—$CH_2C(O)$—O—$(CH_2CH_2O)_{30}$—H, $C_{16}H_{33}$—$CH_2$—C(O)—O—$(CH_2CH_2O)_{40}$—H, and $C_{16}H_{33}CH_2$—C(O)—O—$(CH_2CH_2O)_{100}$—H.

The nonionic emulsifiers present in the dispersion of the invention preferably have an average HLB of 8 to 17, more preferably 9 to 15.

The HLB is an expression of the equilibrium between hydrophilic and hydrophobic groups in an emulsifier. The definition of the HLB and also methods for determining it are known to the skilled person and described for example in Journal of Colloid and Interface Science 298 (2006), 441-450, and also the references cited therein, especially reference [23]. HLB (HLB stands for hydrophilic-lipophilic balance) describes the hydrophilic and lipophilic fraction of primarily nonionic surfactants. The HLB for nonionic surfactants can be calculated in accordance with Hans-Dieter Dörfler, Grenzflachen- und Kolloidchemie, VCH, Weinheim, 1994, p. 198, as follows:

$$HLB = 20 \times \left(1 - \frac{M_1}{M}\right)$$

Here, $M_1$ is the molar mass of the lipophilic fraction of a molecule, and M is the molar mass of the whole molecule. The factor 20 is a freely selected scaling factor.

Examples of dispersing protective colloids which can be used include polyvinyl alcohols and also cellulose ethers, such as methylcellulose, hydroxyethylcellulose, and carboxymethylcellulose.

Examples of suitable particles for stabilizing dispersions are partially hydrophobized, finely divided silicas.

Additionally in the compositions of the invention it is possible to use further substances (6). Examples of further substances (6) are further siloxanes, different from the β-ketocarbonyl-functional organosilicon compounds (1) and from the amino-functional organosilicon compounds (2), examples being polyethersiloxanes; silanes, especially alkoxysilanes; thickeners and/or protective colloids; fillers, and also additives, such as, for example, preservatives, disinfectants, wetting agents, corrosion inhibitors, dyes, and fragrances.

If thickeners and/or protective colloids are used in the dispersion of the invention, they are preferably acrylic acid copolymers, cellulose ethers, and polysaccharides, such as xanthan gum, for example.

If thickeners and/or protective colloids are used, they are used in amounts of preferably 0.01 to 2 parts by weight, based on 100 parts by weight of the β-ketocarbonyl-functional organosilicon compounds (1) and of the amino-functional organosilicon compounds (2).

Examples of additives which can be used in accordance with the invention are, for example, preservatives, dyes or fragrances with which the skilled person is familiar, especially preservatives, such as methylisothiazolinone, chloromethylisothiazolinone, benzylisothiazolinone, phenoxyethanol, methylparaben, ethylparaben, propylparaben, butylparaben, isobutylparaben, alkali metal benzoates, alkali metal sorbates, iodopropynyl butylcarbamate, benzyl alcohol, or 2-bromo-2-nitropropane-1,3-diol.

If additives are used, they are preferably used in amounts of 0.0005 to 2 parts by weight, based on 100 parts by weight of the β-ketocarbonyl-functional organosilicon compounds (1) and of the amino-functional organosilicon compounds (2).

The dispersions of the invention preferably have a content of nonvolatile fractions as measured according to DIN EN ISO 3251, of 1 to 80 wt %, more preferably of 30 to 70 wt %.

The pH of the dispersions of the invention is preferably 3 to 11, more preferably 5 to 9.

Mixing and homogenizing tools which can be used in order to produce the compositions of the invention in the form of aqueous dispersions are all dispersing apparatuses known to the skilled person, such as, for example, stirrers, dissolver disks, rotor-stator homogenizers, ultrasonic homogenizers, and high-pressure homogenizers of any of a very wide variety of different constructions.

The aqueous dispersion may be produced continuously, semibatchwise, or batchwise.

For producing the dispersions of the invention, the β-ketocarbonyl-functional organosilicon compounds (1) and the amino-functional organosilicon compounds (2) and any further water-insoluble components may first be dispersed individually, separately from one another, and the dispersions thus produced can be subsequently mixed, or may be dispersed together in any desired combinations, after which these dispersions can then be mixed. Any water-soluble organometallic compounds (3) and additives present may be incorporated by stirring into the dispersions of the invention at the end, for example.

The compositions of the invention in the form of aqueous dispersions of β-ketocarbonyl-functional organosilicon compounds (1) and amino-functional organosilicon compounds (2), emulsifiers, and optionally organometallic compound (3), and optionally additives, are preferably produced by first mixing a portion of the water (5) with the rest of the components to form a highly viscous and nonfluid paste. It is particularly preferred if the yield point (in accordance with DIN 53019-1 and standards referenced therein) of this pasty premix is greater than 100 Pa (25° C.), especially greater than 1000 Pa (25° C.). This pasty premix is preferably then homogenized, under the action of shearing energy, until the desired particle size is reached, and is diluted with water, accompanied by stirring and/or homogenizing, so that a fluid dispersion is formed. Water-soluble organometallic compounds and/or additives are preferably incorporated into this dispersion by stirring at the end.

The dispersions of the invention preferably comprise more than 50 parts by weight, more preferably 50 to 1000 parts by weight, and most preferably 80 to 500 parts by weight of water (5), based on 100 parts by weight of β-ketocarbonyl-functional organosilicon compounds (1) and amino-functional organosilicon compounds (2).

A further subject of the invention is a method for finishing or impregnating fibrous substrates especially for hydrophobizing fibrous substrates, with the compositions of the invention.

Examples of fibrous substrates are natural or synthetically produced fibers, yarns, skeins, cables, sheetlike textile structures such as nonwovens, mats, woven, bonded or knitted textiles, and also leather and leatherette.

Preferred fibrous substrates are textiles. For the application of the composition of the invention, the textiles may be in the form of individual fibers, fiber bundles, fiberfill fibers, yarns, carpets, fabric webs or garments or parts of garments.

The textiles may consist of cotton, wool, copolymers of vinyl acetate, rayon, hemp, natural silk, polypropylene, polyethylene, polyester, polyurethane, polyamide, aramid, polyimide, polyacrylate, polyacrylonitrile, polylactide, polyvinyl chloride, glass fibers, ceramic fibers, cellulose, or mixtures thereof.

Application to the textiles to be treated may take place in any desired manner suitable and widely known for the treatment of textiles, as for example by dipping, spreading, casting, spraying, roll application, pad-mangling, printing or foam application.

At application, the composition of the invention may be combined with commonplace textile assistants, such as, for example, binders comprising melamine resins or methylol resins, polyurethanes, polyacrylates, polyvinyl alcohols, polyvinyl acetates, optical brighteners, wetting assistants, defoamers, or further hydrophobizing and oleophobizing auxiliaries, such as perfluorinated hydrocarbons.

The treated textiles are allowed to dry preferably at temperatures of 10° C. to 250° C., more preferably 25 to 200° C., and most preferably 80° C. to 180° C.

At this stage the composition of the invention undergoes crosslinking, so rendering the treated textiles water-repellent.

The compositions of the invention comprising β-ketocarbonyl-functional organosilicon compounds (1), amino-functional organosilicon compounds (2), and optionally organometallic compounds (3) have the advantage that they permit very effective water-repellent finishing of various textiles, that they are easy and safe to process, that they can be produced without substances that are persistent environmental pollutants, and that the water-repellent finish exhibits very good wash permanence.

In the examples below, all data for parts and percentages, unless otherwise indicated, are given by weight. Unless otherwise indicated, the following examples are carried out under a pressure of the surrounding atmosphere, in other words at approximately 1010 hPa, and at room temperature, in other words approximately 25° C., or at a temperature which comes about when the reactants are brought together at room temperature without additional heating or cooling.

All of the viscosity data referred to in the examples are based on a temperature of 25° C.

Measurement was carried out, for values between 2000 and 4000 mPas, with a Brookfield RVDVI+ viscometer from Brookfield D-73547 Lorch, using the spindle RV 1, at a rotary speed of 2.5 revolutions per minute, and for values between 4000 and 14 000 mPas using the same instrument and spindle RV 2 at a rotary speed of 2.5 revolutions per minute. The method is discernible in the examples when the unit indicated is [mPas]. For values <2000 mPas, the viscosity measurement takes place using an Ubbelohde viscometer in accordance with DIN 51562-1. The method is discernible in the examples when the unit indicated is [mm$^2$/s].

With regard to the HLB data, the HLB values used are those reported by the respective manufacturers. Because emulsifiers, like the polyethers, for example, are usually oligomers/polymers with a distribution of molecular weights, this distribution may vary from one producer to another. Accordingly, from producer to producer, there may also be different figures for the corresponding HLB, which may also differ from the HLB determined theoretically for the particular chemical name specified.

The particle sizes are determined on a Zetasizer Nano-S particle size measuring instrument from Malvern, Software Version 6.01, by dynamic light scattering (Mie measurement method). For this purpose, the dispersions are diluted to 0.5 wt % with filtered and degassed water. The values reported also refer to the D(50) value. D(50) should be understood as the volume-average particle diameter, at which 50% of all the particles measured have a volume-average diameter smaller than the D(50) figure identified. The measurements take place at 25° C. with the following specified settings: refractive index of water (dispersant RI) at 1.330; viscosity (cP) at 0.8872; refractive index of the dispersed phase (material RI) at 1.39; material absorption at 0.010; measuring time (duration used) at 50 s; measurement position at 0.65 mm. The photon count rates reported in the dispersion examples come from the particular degree of dilution of the samples, and therefore differ. All that is important here is that the measurement program releases the results with the comment 'Result Quality: Good'.

The hydrophobicity of the treated textiles is tested via spray testing in accordance with AATCC Test Method No. 22-2005. In this test, the textiles are spotted with deionized water. The outcome, from comparing the spotted textile surface with the rating pictures in the description of the method, provides an approximate indication of the percent of the area that has remained unwetted. A spray value of 100 denotes a completely unwetted textile.

Preparation of the β-Ketocarbonyl-Functional Organosilicon Compounds (1)

Synthesis Example 1 of a
β-Ketocarbonyl-Functional Organosilicon
Compound (1)

50.7 g of technical alkyl ketene dimer (available from TRIGON Chemie GmbH), prepared from a mixture of palmitic/stearic acid (about 30/70), resulting in a $C_{14}/C_{16}$ alkyl radical $R^3$, are melted at 50° C. 500.0 g of a polysiloxane consisting of (3-aminopropyl)dimethylsiloxy units and dimethylsiloxy units, with a viscosity of 508 mm$^2$/s (at 25° C.) and an amine number of 0.18 mmol/g, are metered in over a period of 70 minutes at a rate such that the temperature of the reaction mixture does not exceed 75° C. The technical alkyl ketene dimer product has a diketene content of 85%, resulting in an alkyl ketene dimer:polysiloxane stoichiometry of 1.0:1.0. After the end of metering, the temperature is raised to 100° C. and stirring is continued at this temperature for an hour. Cooling to room temperature gives a β-ketocarbonyl-functional organosilicon compound (1) in which free amine is no longer detectable.

Synthesis Example 2 of a
β-Ketocarbonyl-Functional Organosilicon
Compound (1)

83.3 g of the alkyl ketene dimer described in example 1 are reacted as in example 1 with 250 g of a mixed hydroxy-/methoxy-terminated copolymer composed of (2-aminoethyl-3-amino-propyl)methylsiloxy units and dimethylsiloxy units, with a viscosity of 977 mm$^2$/s (25° C.) and an amine number of 0.58 mmol/g. This gives a β-ketocarbonyl-functional organosilicon compound (1) in which free amine is no longer detectable.

Synthesis Example 3 of a
β-Ketocarbonyl-Functional Organosilicon
Compound (1)

133 g of the alkyl ketene dimer described in example 1 are reacted as in example 1 with 200 g of a mixed hydroxy-/methoxy-terminated copolymer composed of (2-aminoethyl-3-amino-propyl)methoxysiloxy units and dimethylsiloxy units, with a viscosity of 25 mm$^2$/s (25° C.) and an amine number of 2.4 mmol/g. This gives a β-ketocarbonyl-functional organosilicon compound (1) in which free amine is no longer detectable.

Synthesis Example 4 of a
β-Ketocarbonyl-Functional Organosilicon
Compound (1)

114 g of the alkyl ketene dimer described in example 1 are reacted as in example 1 with 263 g of a polysiloxane consisting of (2-aminoethyl-3-aminopropyl)dimethylsiloxy units and dimethylsiloxy units, with a viscosity of 119 mm$^2$/s (25° C.) and an amine number of 0.76 mmol/g. This gives a β-ketocarbonyl-functional organosilicon compound (1) in which free amine is no longer detectable.

Synthesis Example 5 of a
β-Ketocarbonyl-Functional Organosilicon
Compound (1)

19 g of the alkyl ketene dimer described in example 1 are reacted as in example 1 with 358 g of a polysiloxane composed of (3-aminopropyl)methylsiloxy, trimethylsiloxy, and dimethylsiloxy units, with a viscosity of 259 mm$^2$/s (25° C.); and an amine number of 0.093 mmol/g. This gives a β-ketocarbonyl-functional organosilicon compound (1) in which free amine is no longer detectable.

Synthesis Example 6 of a
β-Ketocarbonyl-Functional Organosilicon
Compound (1) where $R^3$ is H Rather than a
Hydrocarbon in the Radical A of Formula (I)

136.5 g of a polysiloxane consisting of (2-aminoethyl-3-aminopropyl)methylsiloxy units and dimethylsiloxy units, with a viscosity of 980 mm$^2$/s and an amine number of 0.293 mmol/g, are stirred with 4.7 g of acetone at 25° C. for 4 hours. This is followed by addition of 3.7 g of diketene, whereupon a slight increase in temperature occurs. After a further 2 hours, the acetone is removed under reduced pressure at 70° C. This gives a clear, yellowish oil having a viscosity of 4900 mm$^2$/s (25° C.). In the $^1$H NMR spectrum, complete conversion of amine is evident.

Preparation of the Amino-Functional Organosilicon Compound (2)

Synthesis Example 7 of a Waxlike Amino-Functional Organosilicon Compound (2)

a) Hydrolysis of 3-Aminopropylmethyldiethoxysilane:

170.0 g of 3-aminopropylmethyldiethoxysilane are heated to 50° C. under a nitrogen atmosphere. Then 50.0 g of fully demineralized water are added dropwise with stirring over the course of 20 minutes, the temperature climbing to around 80° C. The temperature is then raised to 100° C., and ethanol liberated is distilled off initially under atmospheric pressure and subsequently under increasing reduced pressure, until at 100° C., under full vacuum, there is no longer any distillate produced. Cooling affords approximately 100 g of a colorless to pale yellowish liquid having a viscosity of 850 mm$^2$/s (25° C.) and an amine number of 8.3 mmol/g.

b) Preparation of the Waxlike Amino-Functional Organosilicon Compound (2):

1013.0 g of a polysiloxane consisting of trimethylsiloxy units and (octadecyl)methylsiloxy units, having a melting point of 41° C. are heated to 60° C. under a nitrogen atmosphere. 56.4 g of the hydrolysate from a) are stirred into the melt before the mixture is heated to 90° C. 2.0 g of a 40% aqueous solution of tetrabutylphosphonium hydroxide are added. The slightly turbid mixture is stirred at 90° C. for 5 hours until it clears. Thereafter 0.3 g of 90% lactic acid is added and stirring is continued at 90° C. for 30 minutes. The temperature is subsequently raised to 160° C. and slowly, reduced pressure is applied up to full vacuum. As soon as volatile fractions are no longer distilled off, the product is cooled. This gives a slightly brownish, waxlike solid having a melting temperature of 45° C. and an amine number of 0.44 mmol/g.

Production of the Dispersions of (1)

Dispersion Example 1: Dispersion of β-Ketocarbonyl-Functional Organosilicon Compound (1) from Synthesis Example 1

6.0 g of lauric acid, available commercially (from Merck Schuchardt), 3.9 g of an aqueous solution of potassium hydroxide (50% strength) and 2.0 g of polyoxyethylene(4) lauryl ether (HLB: 9.7), available commercially under the tradename Sympatens-ALM/040 (from Kolb) and 6.7 g of fully demineralized water are charged to a metal beaker and heated to 60° C. in a drying cabinet. The mixture, which is now liquid, is homogenized using an Ultra-Turrax T 50 disperser (from Janke & Kunkel/IKA). Within this time, 70 g of the β-ketocarbonyl-functional organosilicon compound from synthesis example 1 are melted in the drying cabinet at 60° C. and added in three portions with high shearing of 6000 to 8000 rpm in such a way as to result in a preliminary dispersion in the form of a relatively firm stiff phase. Dilution is carried out with 110.8 g of fully demineralized water, heated to 60° C., in portions, with little shearing, to give the desired dispersion. The result is a milky white dispersion having an average particle size D(50) of 171 nm with a photon count rate of 364 kcps (kilocounts per second). The dispersion is carefully deaerated using a desiccator.

Dispersion Examples 2 to 5: Dispersions of β-Ketocarbonyl-Functional Organosilicon Compound (1) from Synthesis Examples 2 to 5

Dispersions 2 to 5 are produced using the same types and amounts of the emulsifier-water mixture from dispersion example 1 (6.0 g of lauric acid, 3.9 g of an aqueous solution of potassium hydroxide (50% strength), 2.0 g of polyoxyethylene(4) lauryl ether (HLB=9.7), 6.7 g of fully demineralized water), 70 g of β-ketocarbonyl-functional organosilicon compound (1) according to synthesis examples 2 to 5 and also 110.8 g of heated water.

In the case of the β-ketocarbonyl-functional organosilicon compound according to synthesis example 2, the result is a milky white dispersion having an average particle size D(50) of 177 nm with a photon count rate of 207 kcps.

In the case of the β-ketocarbonyl-functional organosilicon compound according to synthesis example 3, the result is a milky white dispersion having an average particle size D(50) of 105 nm with a photon count rate of 393 kcps.

In the case of the β-ketocarbonyl-functional organosilicon compound according to synthesis example 4, the result is a milky white dispersion having an average particle size D(50) of 153 nm with a photon count rate of 271 kcps.

In the case of the β-ketocarbonyl-functional organosilicon compound according to synthesis example 5, the result is a milky white dispersion having an average particle size D(50) of 170 nm with a photon count rate of 221 kcps.

Dispersion Example 6: Dispersion of β-Ketocarbonyl-Functional Organosilicon Compound (1) of Synthesis Example 6

4.0 g of polyoxyethylene(5) isotridecyl ether, available commercially under the tradename Lutensol® TO 5 (from BASF) (HLB=10.5), 8.0 g of polyoxyethylene(8) isotridecyl ether, available commercially under tradename Lutensol® TO 8 (from BASF) (HLB about 13) and 13.4 g of fully demineralized water are charged to a metal beaker. The liquid mixture is homogenized using an Ultra-Turrax T 50 disperser (from Janke & Kunkel/IKA). 66.2 g of the β-ketocarbonyl-functional organosilicon compound from synthesis example 6 are added in three portions with high shearing of 6000 to 8000 rpm in such a way as to result in a preliminary dispersion comprising a relatively firm stiff phase. Dilution takes place with 107.6 g of fully demineralized water in portions, with little shearing, to give the desired dispersion. The result is a milky white dispersion having an average particle size D(50) of 185 nm with a photon count rate of 387 kcps. The dispersion is carefully deaerated using a desiccator.

Production of the Dispersions of (2)

Dispersion Example 7: Dispersion of an Amino-Functional Organosilicon Compound (2)

9.7 g of an 80% aqueous solution of polyoxyethylene(10) isotridecyl ether, available commercially under the tradename Lutensol® TO 108 (from BASF) (HLB=13.7) and 2.9 g of fully demineralized water are charged to a metal beaker. The liquid mixture is homogenized using an Ultra-Turrax T 50 disperser (from Janke & Kunkel/IKA). 70 g of a mixed hydroxy-/methoxy-terminated copolymer composed of (2-aminoethyl-3-aminopropyl)methylsiloxy units and dimethylsiloxy units, with a viscosity of 3552 mPas (25° C.) and an amine number of 0.14 mmol/g, are added in three portions with high shearing of 6000 to 8000 rpm in such a way as to result in a preliminary dispersion comprising a relatively firm stiff phase. Dilution takes place with 118.0 g of fully demineralized water in portions, with little shearing, and the resulting dispersion is stabilized with 0.3 g of 80% acetic acid in water. The result is a milky white dispersion having an average particle size D(50) of 116 nm with a photon count rate of 246 kcps. The dispersion is carefully deaerated using a desiccator.

Dispersion Example 8: Dispersion of an Amino-Functional Organosilicon Compound (2)

12.5 g of an 80% aqueous solution of polyoxyethylene (10) isotridecyl ether, available commercially under the tradename Lutensol® TO 108 (from BASF) (HLB=13.7), 5.0 g of fully demineralized water, and 0.7 g of 80% acetic acid in water are charged to a metal beaker. The liquid mixture is homogenized using an Ultra-Turrax T 50 disperser (from Janke & Kunkel/IKA). First, 4.5 g of a mixed hydroxy-/methoxy-terminated copolymer composed of (2-aminoethyl-3-aminopropyl)methylsiloxy units and dimethylsiloxy units, with a viscosity of 29 mm$^2$/s (25° C.) and an amine number of 2.9 mmol/g and then 95.5 g of a hydroxy-terminated polydimethylsiloxane with a viscosity of 5960 mPas are added in three portions with high shearing of 6000 to 8000 rpm in such a way as to result in a preliminary dispersion comprising a relatively firm stiff phase. Dilution takes place with 81.5 g of fully demineralized water in portions, with little shearing, to give the desired dispersion. The result is a milky white dispersion having an average particle size D(50) of 180 nm with a photon count rate of 217 kcps. The dispersion is carefully deaerated using a desiccator.

Dispersion Example 9: Dispersion of a Waxlike Amino-Functional Organosilicon Compound (2) from Synthesis Example 7 b)

9.7 g of an 80% aqueous solution of polyoxyethylene(10) isotridecyl ether, available commercially under the tradename Lutensol® TO 108 (from BASF) (HLB=13.7) and 2.9 g of fully demineralized water are charged to a metal beaker and heated to 60° C. in a drying cabinet. The liquid mixture is homogenized using an Ultra-Turrax T 50 disperser (from Janke & Kunkel/IKA). 70 g of a waxlike trimethylsilyl-terminated copolymer composed of (3-aminopropyl)methylsiloxy units and octadecylmethylsiloxy units, from synthesis example 7 b, are melted within this time at 60° C. in the drying cabinet and added in three portions with high shearing of 6000 to 8000 rpm in such a way as to result in a preliminary dispersion comprising a relatively firm stiff phase. Dilution takes place with 118.0 g of fully demineralized water in portions, with little shearing, and the resulting dispersion is stabilized with 2.0 g of 80% acetic acid in water. The result is a milky white dispersion having an average particle size D(50) of 171 nm with a photon count rate of 275 kcps. The dispersion is carefully deaerated using a desiccator.

Production of Dispersions of the Inventive Compositions Comprising (1), (2), and Optionally (3)

Dispersion Example 10 (Inventive Composition)

Dispersion of β-Ketocarbonyl-Functional Organosilicon Compound (1) from Synthesis Example 1 and of an Amino-Functional Organosilicon Compound (2):
9.7 g of a 80% strength aqueous solution of polyoxyethylene(10) isotridecyl ether, available commercially under the tradename Lutensol® TO 108 (from BASF) (HLB=13.7), 2.9 g of fully demineralized water, and 0.2 g of 80% acetic acid in water are charged to a metal beaker and heated to 60° C. in the drying cabinet. The liquid mixture is homogenized using an Ultra-Turrax T 50 disperser (from Janke & Kunkel/IKA). 43 g of the β-ketocarbonyl-functional organosilicon compound (1) from synthesis example 1 and 27 g of a mixed hydroxy-/methoxy-terminated copolymer composed of (2-aminoethyl-3-aminopropyl)methylsiloxy units and dimethylsiloxy units, with a viscosity of 3552 mPas (25° C.) and an amine number of 0.14 mmol/g, are melted or heated within this time within the drying cabinet at 60° C. and are in each case added one after another in two portions, with high shearing at 6000 to 8000 rpm, in such a way as to result in a preliminary dispersion comprising a relatively firm stiff phase. Dilution takes place with 118.0 g of fully demineralized water in portions, with little shearing, to give the desired dispersion. The result is a milky white dispersion having an average particle size D(50) of 163 nm with a photon count rate of 420 kcps. The dispersion is carefully deaerated using a desiccator.

Dispersion Example 11 (Inventive Composition)

Dispersion of β-Ketocarbonyl-Functional Organosilicon Compound (1) from Synthesis Example 2 and of an Amino-Functional Organosilicon Compound (2):
9.7 g of a 80% strength aqueous solution of polyoxyethylene(10) isotridecyl ether, available commercially under the tradename Lutensol® TO 108 (from BASF) (HLB=13.7), 2.9 g of fully demineralized water, and 0.3 g of 80% acetic acid in water are charged to a metal beaker and heated to 60° C. in the drying cabinet. The liquid mixture is homogenized using an Ultra-Turrax T 50 disperser (from Janke & Kunkel/IKA). 23 g of the β-ketocarbonyl-functional organosilicon compound (1) from synthesis example 2 and 47 g of a mixed hydroxy-/methoxy-terminated copolymer composed of (2-aminoethyl-3-aminopropyl)methylsiloxy units and dimethylsiloxy units, with a viscosity of 3552 mPas (25° C.) and an amine number of 0.14 mmol/g, are melted or heated within this time within the drying cabinet at 60° C. and are are in each case added one after another in two portions, with high shearing at 6000 to 8000 rpm, in such a way as to result in a preliminary dispersion comprising a relatively firm stiff phase. Dilution takes place with 118.0 g of fully demineralized water in portions, with little shearing, to give the desired dispersion. The result is a milky white dispersion having an average particle size D(50) of 171 nm with a photon count rate of 292 kcps. The dispersion is carefully deaerated using a desiccator.

Dispersion Example 12 (Inventive Composition)

Dispersion of β-Ketocarbonyl-Functional Organosilicon Compound (1) from Synthesis Example 1, and of an Amino-Functional Organosilicon Compound (2), and of Zirconium Acetate as Organometallic Compound (3):
Dispersion example 12 is produced like dispersion example 10, but without addition of acetic acid and with the stirred incorporation, after the dilution with water, of 25 g of a zirconium acetate solution (from Brenntag) with a $ZrO_2$ content of around 22%. The result is a milky white dispersion having an average particle size D(50) of 186 nm with a photon count rate of 339 kcps. The dispersion is carefully deaerated using a desiccator.

Working Examples

Inventive compositions each comprising a β-ketocarbonyl-functional organosilicon compound (1) and an amino-functional organosilicon compound (2), and, where appropriate, an organometallic compound (3), and also noninventive compositions, containing either only a β-ketocarbonyl-functional organosilicon compound (1) or only an amino-functional organosilicon compound (2), and, where appropriate, an organometallic compound (3), are produced in the proportions as shown in the working examples listed in tables 1 and 2 to 5, by mixing of the individual components.

Working examples 1 and 2 are inventive compositions in solution in organic solvents (see table 1).

Working examples 3 to 25 are inventive or noninventive compositions in the form of their aqueous dispersions (see tables 2 to 5).

In working examples 1 and 2, the individual components are predissolved in around 100 mil of petroleum spirit in each case; these solutions are mixed, diluted for finishing on textiles with petroleum spirit (boiling range 60 to 80° C.) in the laboratory fume cupboard to 1 liter of liquor, and then applied as follows to sheetlike textile structures:

A DIN A4 size piece of bleached, unfinished polyester-cotton poplin (65% PET, 35% CO) is used, with a basis weight of 185 g/m².

The fabric is immersed into the liquor and is subsequently allowed to dry in a fume cupboard overnight while stretched out horizontally in a Mathis laboratory tenter frame. On the following day, postcrosslinking takes place in the tenter frame at 150° C. for 5 minutes. The material is thereafter conditioned for at least 72 hours in a conditioning chamber at 23° C. and 60% humidity, to condition it sufficiently for the purpose of determination of the hydrophobization.

In working examples 3 to 25, the corresponding dispersions and/or mixtures, for finishing on textiles, are diluted with water to one liter of liquor, and then applied as follows to sheetlike textile structures:

A DIN A4 size piece of bleached, unfinished polyester-cotton poplin (65% PET, 35% CO) is used, with a basis weight of 185 g/m².

The fabric is immersed into an aqueous liquor and is subsequently squeezed off to 50% liquor pickup using a two-roll pad mangle, stretched out and dried for 5 minutes at 150° C. in a Mathis laboratory tenter frame. The material is thereafter conditioned for at least 72 hours in a conditioning chamber at 23° C. and 60% humidity, to condition it sufficiently for the purpose of determination of the hydrophobization.

After the spraying test has been carried out, the textiles are dried on a washing line in the conditioning chamber overnight.

To investigate the wash fastness properties, all of the finished textiles are washed once together with about 2 kg of ballast fabric in a MIELE Softtronic W 1935 household washing machine using the Express 20 wash program at 40° C. for 20 minutes, and spun. Added as a laundering surfactant are 5 g of a Henkel "Spee Feinwaschmittel" liquid laundry detergent.

The material is subsequently dried and conditioned in the conditioning chamber for at least 12 hours at 23° C. and 60% humidity.

To remove the creasing resulting from the wash, the test specimens are ironed using a Philips Azur 4043 iron on setting II. The swatches are then again tested for hydrophobicity by the spraying test method.

The working examples, with weighed-out amounts for the mixtures and with spraying test outcomes before laundering and after a household wash, are set out in tables 1 to 5.

TABLE 1

| Working example comprising organic solvent Petroleum spirit (boiling range 60 to 80° C.) | Fraction of β-ketocarbonyl-functional organosilicon compound from synthesis example 1 | Fraction of mixed hydroxy-/methoxy- terminated copolymer composed of (2-aminoethyl-3-aminopropyl)methylsiloxy and dimethylsiloxy units, with a viscosity of 3552 mm2/s (25° C.) and an amine number of 0.14 mmol/g | Fraction of butyl titanate (>98% butyl titanate (IV), available from Dorf Ketal under the name TYZOR® TnBT) | Appearance of mixture | Spray test | Spray test, washed |
|---|---|---|---|---|---|---|
| 1 (inventive) | 8.7 g predissolved in about 100 ml of petroleum spirit | 5.3 g predissolved in about 100 ml of petroleum spirit | — | Clear homogeneous | 90 | 80 |
| 2 (inventive) | 8.7 g predissolved in about 100 ml of petroleum spirit | 5.3 g predissolved in about 100 ml of petroleum spirit | 1.0 g predissolved in about 100 ml of petroleum spirit | Clear homogeneous | 100 | 100 |

TABLE 2

| Working example comprising aqueous dispersion | Fraction from β-keto-silicone dispersion example | Fraction from amino-silicone dispersion example | Fraction of zirconium acetate (aqueous solution with 22% ZrO₂) | Appearance of mixture | Spray test | Spray test, washed |
|---|---|---|---|---|---|---|
| 3 (inventive) | 25 g No. 1 | 15 g No. 7 | 5 g | Milky homogeneous | 100 | 100 |
| 4 (inventive) | 21 g No. 1 | 19 g No. 8 | 5 g | Milky homogeneous | 100 | 100 |
| 5 (inventive) | 23 g No. 1 | 17 g No. 9 | — | Milky homogeneous | 90 | 80 |

TABLE 2-continued

| Working example comprising aqueous dispersion | Fraction from β-keto-silicone dispersion example | Fraction from amino-silicone dispersion example | Fraction of zirconium acetate (aqueous solution with 22% ZrO$_2$) | Appearance of mixture | Spray test | Spray test, washed |
|---|---|---|---|---|---|---|
| 6 (inventive) | 23 g No. 1 | 17 g No. 9 | 5 g | Milky homogeneous | 100 | 90 |
| 7 (inventive) | 13 g No. 2 | 27 g No. 7 | 5 g | Milky homogeneous | 100 | 90 |
| 8 (inventive) | 16 g No. 2 | 24 g No. 8 | 5 g | Milky homogeneous | 100 | 90 |
| 9 (inventive) | 29 g No. 2 | 11 g No. 9 | 5 g | Milky homogeneous | 100 | 90 |
| 10 (inventive) | 6 g No. 3 | 34 g No. 7 | 5 g | Milky homogeneous | 100 | 90 |
| 11 (inventive) | 14 g No. 4 | 36 g No. 7 | 5 g | Milky homogeneous | 100 | 90 |
| 12 (inventive) | 39 g No. 5 | 1 g No. 7 | 5 g | Milky homogeneous | 100 | 80 |
| 13 (inventive) | 40 g No. 10 | | 5 g | Milky homogeneous | 100 | 90 |
| 14 (inventive) | 40 g No. 11 | | 5 g | Milky homogeneous | 100 | 90 |
| 15 (inventive) | 45 g No. 12 | | | Milky homogeneous | 100 | 90 |

TABLE 3

| Comparative comprising aqueous dispersion | Fraction from β-keto-silicone dispersion example | Fraction from amino-silicone dispersion example | Fraction of zirconium acetate (aqueous solution with 22% ZrO$_2$) | Appearance of mixture | Spray test | Spray test, washed |
|---|---|---|---|---|---|---|
| 16 (not inventive) | 40 g No. 1 | — | 5 g | Not stable | — | — |
| 17 (not inventive) | 40 g No. 2 | — | 5 g | Not stable | — | — |
| 18 (not inventive) | — | 40 g No. 7 | 5 g | Milky homogeneous | 70 | 50 |
| 19 (not inventive) | — | 40 g No. 8 | 5 g | Milky homogeneous | 70 | 50 |
| 20 (not inventive) | 40 g No. 1 | — | — | Milky homogeneous | 50 | 0 |

TABLE 4

| Comparative example comprising aqueous dispersion in combination with organic polyamine instead of aminosilicone | Fraction from β-keto-silicone dispersion example | Fraction of polyvinylamine solution 6% in water (M ~340 000 g/mol); tradename: Lupamin 9095 from BASF | Fraction of zirconium acetate (aqueous solution with 22% ZrO$_2$) | Appearance of mixture | Spray test | Spray test, washed |
|---|---|---|---|---|---|---|
| 21 (not inventive) | 39 g No. 1 | 1 g | 5 g | Not stable | — | — |
| 22 (not inventive) | 39 g No. 1 | 1 g | — | Milky homogeneous | 70 | 50 |

TABLE 5

| Working or comparative example comprising aqueous dispersion with diketene-based β-keto-silicone | Fraction from β-keto dispersion example | Fraction from amino dispersion example | Fraction of zirconium acetate (aqueous solution with 22% ZrO$_2$) | Appearance of mixture | Spray test | Spray test, washed |
|---|---|---|---|---|---|---|
| 23 (inventive) | 24 g No. 6 | 16 g No. 7 | 5 g | Milky homogeneous | 100 | 80 |
| 24 (not inventive) | 40 g No. 6 | — | 5 g | Not stable | — | — |

TABLE 5-continued

| Working or comparative example comprising aqueous dispersion with diketene-based β-keto-silicone | Fraction from β-keto dispersion example | Fraction from amino dispersion example | Fraction of zirconium acetate (aqueous solution with 22% ZrO$_2$) | Appearance of mixture | Spray test | Spray test, washed |
|---|---|---|---|---|---|---|
| 25 (not inventive) | 40 g No. 6 | — | — | Milky homogeneous | 50 | 0 |

From the working examples it is clearly apparent that only the combinations of β-ketocarbonyl-functional organosilicon compounds (1) with amino-functional organosilicon compounds (2) feature good spray test values (100) and have much better wash resistances than the individual components on their own (see examples 3 to 15 in table 2 in contrast to comparative examples 16 to 20 in table 3).

Dispersions of β-ketocarbonyl-functional organosilicon compounds (1) become unstable if there are combined on their own with zirconium acetate (see comparative examples 16 and 17 in table 3). In these cases, silicone precipitations occur.

It was therefore surprising that the inventive triple combination of β-ketocarbonyl-functional organosilicon compound (1), amino-functional organosilicon compound (2), and organometallic compound (3) remains stable (examples 1 to 15 in tables 1 and 2), whereas the noninventive double combination of β-ketocarbonyl-functional organosilicon compound (1) and organometallic compound (3) (comparative examples 16 and 17 in table 3) and also the noninventive triple combination of J-ketocarbonyl-functional organosilicon compound (1), organic polyamine, and organometallic compound (3) (comparative examples 21 and 22 in table 4) lead in each case to precipitations (see tables 3 and 4).

All textiles finished according to the mandates of the working examples exhibit a pleasing soft hand.

The invention claimed is:

1. A composition, comprising:
   (1) at least one β-ketocarbonyl-functional organosilicon compound which comprises at least one Si-bonded radical A of the formula $$(Si)\text{-}L^1\text{-}[X^1\text{-}L^2\text{-}]_y X^2 \quad (I)$$

where
   L$^1$ is a divalent, Si—C-bonded hydrocarbon radical having 1 to 18 carbon atoms,
   L$^2$ is a divalent hydrocarbon radical having 1 to 6 carbon atoms,
   X$^1$ is a radical of the formula —NZ—,
   X$^2$ is a radical of the formula —NH—Z,
   Z is a radical of the formula —C(=O)—CHR$^3$—C(=O)—CH$_2$R$^3$,
   R$^3$ is a monovalent, optionally substituted hydrocarbon radical having at least 12 carbon atoms,
   y is 0, 1, 2 or 3, and
   (Si)— is the bond to the Si atom,
   (2) at least one amino-functional organosilicon compound having at least one Si-bonded radical B of the formula $$(Si)\text{—}P^1\text{—}[Y^1\text{—}P^2\text{-}]_z Y^2 \quad (ii),$$

where
   P$^1$ and P$^2$ have the same definition as L$^1$ and L$^2$,
   Y$^1$ is a radical of the formula —NH— or —NR$^4$—,
   Y$^2$ a radical of the formula NH$_2$ or NHR$^4$,
   R$^4$ is a monovalent hydrocarbon radical having 1 to 18 carbon atoms,
   z is 0, 1, 2 or 3 and
   (Si)— is the bond to the Si atom,
   and optionally
   (3) one or more organometallic compounds,
   wherein amino-functional organosilicon compound (2) comprises organopolysiloxanes of the formula $$B_s R^6_{3-s} SiO(SiR'_2O)_n(SiR'BO)_m SiR^6_{3-t} B_t \quad (VI),$$

where
   B is a radical of the formula (II),
   R$^6$ is identical or different and is a radical R' or a radical of the general formula —OR$^5$, where
   R' is a monovalent, optionally substituted hydrocarbon atom having 1 to 18 carbon atoms per radical,
   R$^5$ is a hydrogen atom or an alkyl radical having 1 to 8 carbon atoms,
   s is 0 or 1,
   t is 0 or 1,
   n is 0 or an integer from 1 to 2000, and
   m is 0 or an integer from 1 to 20,
   with the proviso there is on average at least one radical B per molecule.

2. The composition of claim 1, wherein y is 0 or 1.

3. The composition of claim 1, wherein β-ketocarbonyl-functional organosilicon compounds (1) comprise organopolysiloxanes of the formula $$A_g R^*_{3-g} SiO(SiR_2O)_l(SiRAO)_k SiR^*_{3-h} A_h \quad (IV),$$

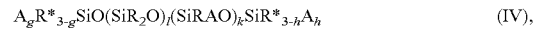

where
A is a radical of the formula (I),
R* is identical or different and is a radical R or a radical of the formula —OR$^1$, where
R is a monovalent, optionally substituted hydrocarbon radical having 1 to 18 carbon atoms per radical,
R$^1$ is a hydrogen atom or an alkyl radical having 1 to 8 carbon atoms,
g is 0 or 1,
h is 0 or 1,
l is 0 or an integer from 1 to 2000, and
k is 0 or an integer from 1 to 20,
with the proviso that there is on average at least one radical A per molecule.

4. The composition of claim 1, wherein organometallic compound(s) (3) comprise amines, alkoxides, carboxylic or phosphoric acid salts or chelates of metals selected from the group consisting of Pb, Zn, Zr, Sb, Fe, Cd, Sn, Ti, Ba, Ca, Mn, V, Al, Co, and mixtures thereof.

5. The compositions of claim 1, wherein the organometallic compound(s) (3) comprise alkoxides or carboxylic acid salts of titanium or zirconium.

6. The composition of claim 1, wherein the organometallic compound(s) (3) comprise butyl titanate, zirconium octoate or zirconium acetate.

7. The composition of claim 1, in the form of an aqueous dispersion comprising
(1) at least one β-ketocarbonyl-functional organosilicon compound having at least one Si-bonded radical of the formula (I),
(2) at least one amino-functional organosilicon compound having at least one Si-bonded radical of the formula (VI),
(3) optionally organometallic compounds,
(4) emulsifiers, and
(5) water.

8. The composition of claim 7, wherein emulsifiers (4) comprise nonionic emulsifiers or mixtures of nonionic and anionic emulsifiers.

9. A method for producing an aqueous dispersions of claim 7, comprising mixing:
(1) β-ketocarbonyl-functional organosilicon compound(s) having at least one Si-bonded radical of the formula (I),
(2) amino-functional organosilicon compound(s) having at least one Si-bonded radical of the formula (VI),
(3) optionally organometallic compounds,
(4) emulsifiers, and
(5) water.

10. A method for finishing fibrous substrates, comprising applying to the fibrous substrate, at least one composition of claim 1.

11. The method of claim 10, wherein the composition is applied to the fibrous substrates and then the fibrous substrates treated are allowed to dry.

12. A method for impregnating fibrous substrates with a composition of claim 1, comprising applying the composition to the fibrous substrate and then drying the fibrous substrates thusly treated.

* * * * *